Nov. 5, 1935.  C. S. JENNINGS ET AL  2,019,861

PNEUMATIC DISPATCH SYSTEM

Filed Nov. 1, 1932  8 Sheets-Sheet 2

Inventors
Chester S. Jennings
Frank W. MacMartin
by Roberts, Cushman & Woodbury
Attys.

Nov. 5, 1935.    C. S. JENNINGS ET AL    2,019,861
PNEUMATIC DISPATCH SYSTEM
Filed Nov. 1, 1932    8 Sheets-Sheet 3
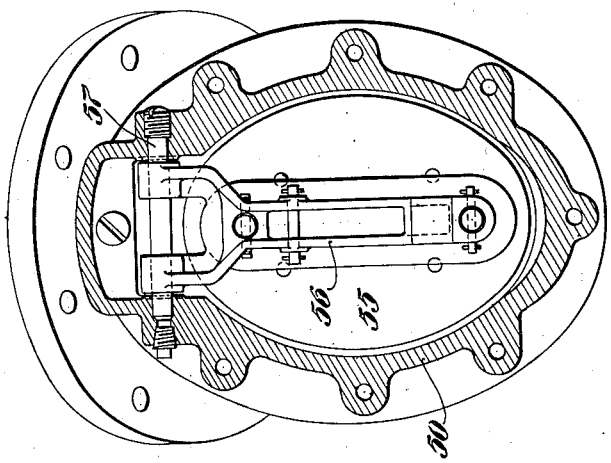
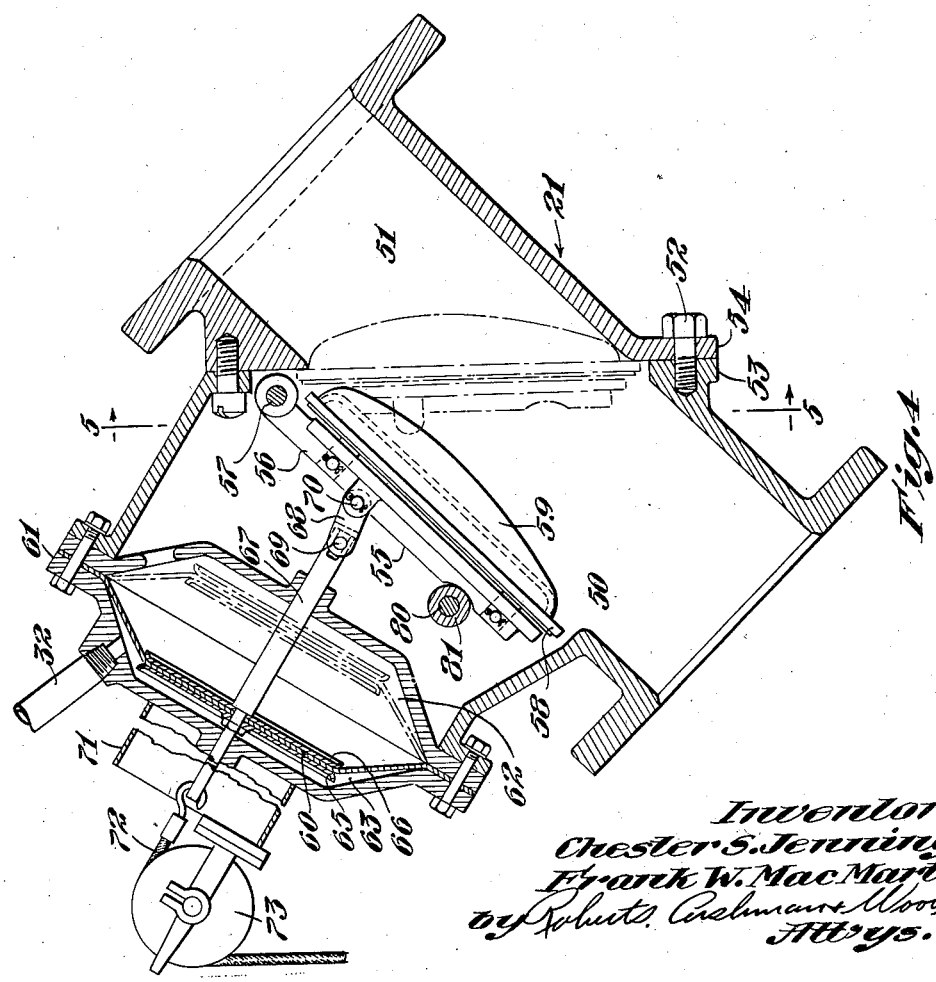

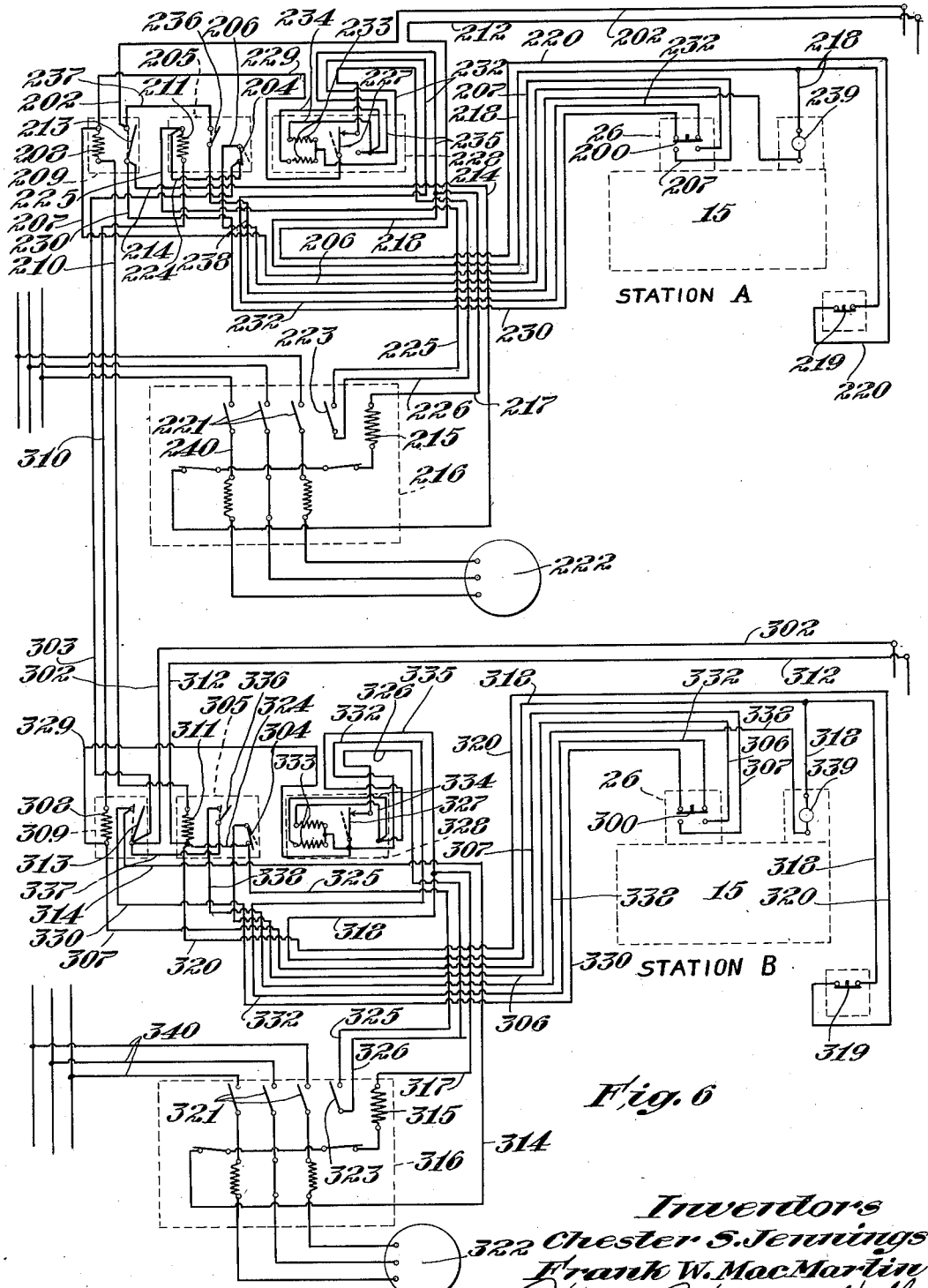

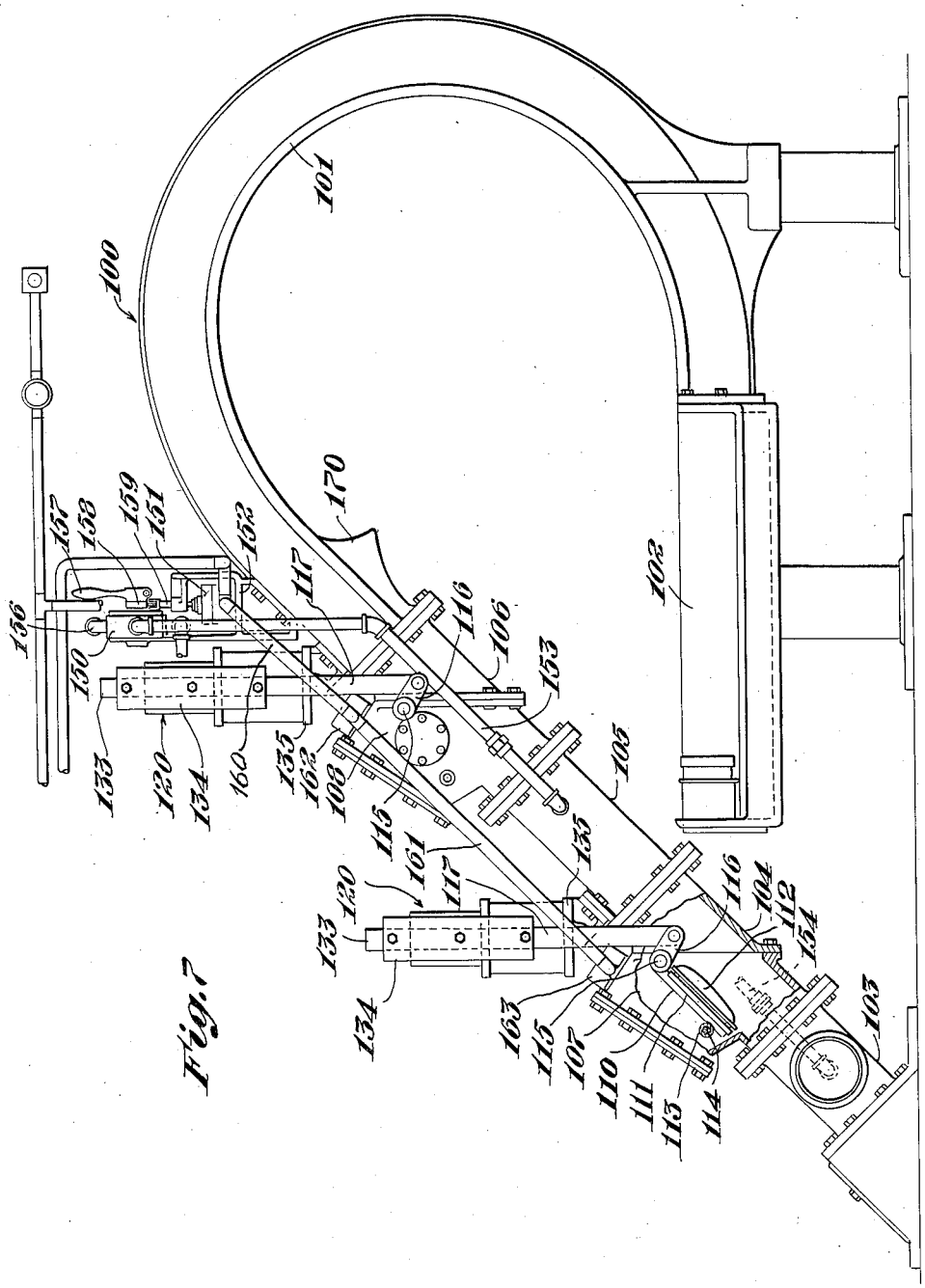

Nov. 5, 1935.  C. S. JENNINGS ET AL  2,019,861
PNEUMATIC DISPATCH SYSTEM
Filed Nov. 1, 1932  8 Sheets-Sheet 6
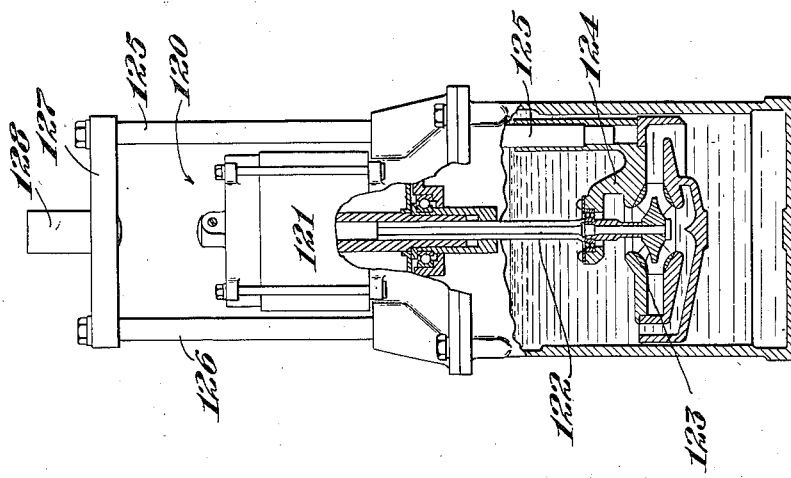
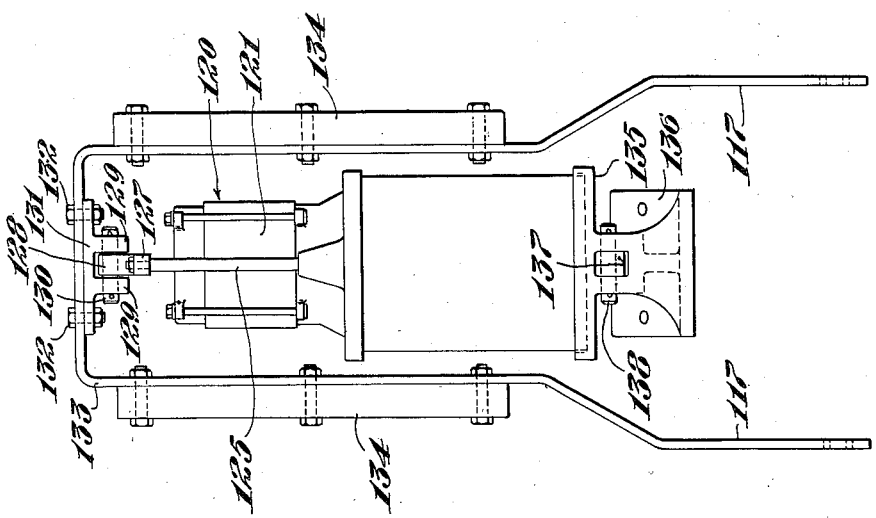
Inventors
Chester S. Jennings
Frank W. MacMartin
Attys.

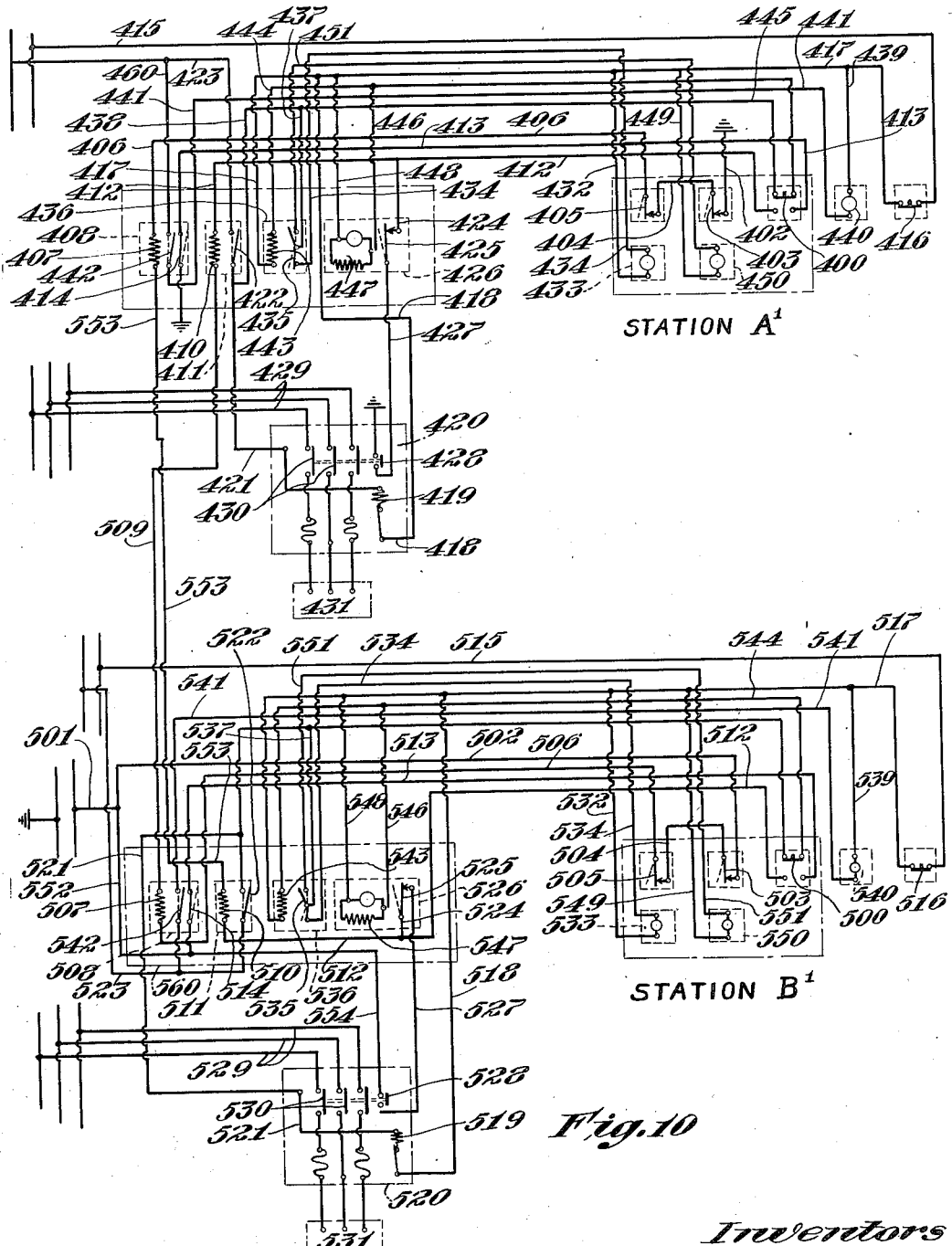

Patented Nov. 5, 1935

2,019,861

UNITED STATES PATENT OFFICE 2,019,861

PNEUMATIC DISPATCH SYSTEM

Chester S. Jennings and Frank W. MacMartin, Syracuse, N. Y., assignors to The Lamson Company, Syracuse, N. Y., a corporation of Massachusetts Application November 1, 1932, Serial No. 640,624

20 Claims. (Cl. 243—8)

This invention relates to an improvement in a pneumatic dispatch system and more particularly in one of the single transit tube type being a further development and modification in certain respects upon the system disclosed in the patent to Jennings No. 1,861,964, dated June 7, 1932 and the patent to Jennings and MacMartin No. 1,871,995, dated August 16, 1932.

Systems of this type are particularly adapted for long line tube systems as for example in railroad yards where the terminals are several thousand feet apart. Since a single transit tube is used it is obviously necessary to avoid the possibility of collision due to the dispatch of a carrier from one terminal when a carrier is already in transit from the other terminal. As disclosed in the patents above referred to such occurrence is avoided by electrical control.

One object of the present invention is to simplify the electrical control heretofore thought to be essential whereby, without impairing the various important and necessary features of the earlier systems, the number of wires running between the terminals is reduced to a minimum, three or two being found all that are necessary; and the initial control is from a single source at one station only, the source at the other station bearing no direct relation whatsoever to the source at the first station but being controlled by relays actuated by the initial control.

Another object of the invention is to provide means for actuating and interlocking the valves at the terminals, such means being either pneumatically operated in conjunction with the air transmitting flow set up in the system or positively operated concomitantly with the set up of such air flow.

A further object of this invention is to provide at the terminals of the systems, air and electrical control devices which are operated simultaneously whereby electrical circuits are completed which set up a carrier transmitting flow of air in the transit tube and a flow of air is set up in the dispatching terminal only when the system is in condition for dispatching.

Other objects will appear from an examination of the following description taken in connection with the drawings which form a part thereof and in which Fig. 1 is a side elevation of a terminal embodying one form of this invention;

Fig. 4 is a sectional view illustrating one of the valves, the clapper being shown in full lines in the open position and in dotted lines in the closed position;

Fig. 5 is a sectional view taken along the line 5—5 of Fig. 4;

Fig. 6 is a diagram illustrating one form of wiring which might be employed with the embodiment shown in Figs. 1 to 5;

Fig. 7 is a side elevation of a terminal embodying another form of this invention;

Fig. 8 is an enlarged view of one element of that terminal;

Fig. 9 is a view of such element with parts broken away;

Fig. 10 is a diagram illustrating one form of wiring which might be employed with the embodiment shown in Figs. 7, 8 and 9.

It will be understood that the system comprises two terminals connected by a single transit tube and that since the terminals are similar in construction and operation only one terminal of each embodiment has been shown and will be described in detail.

Figure 1:
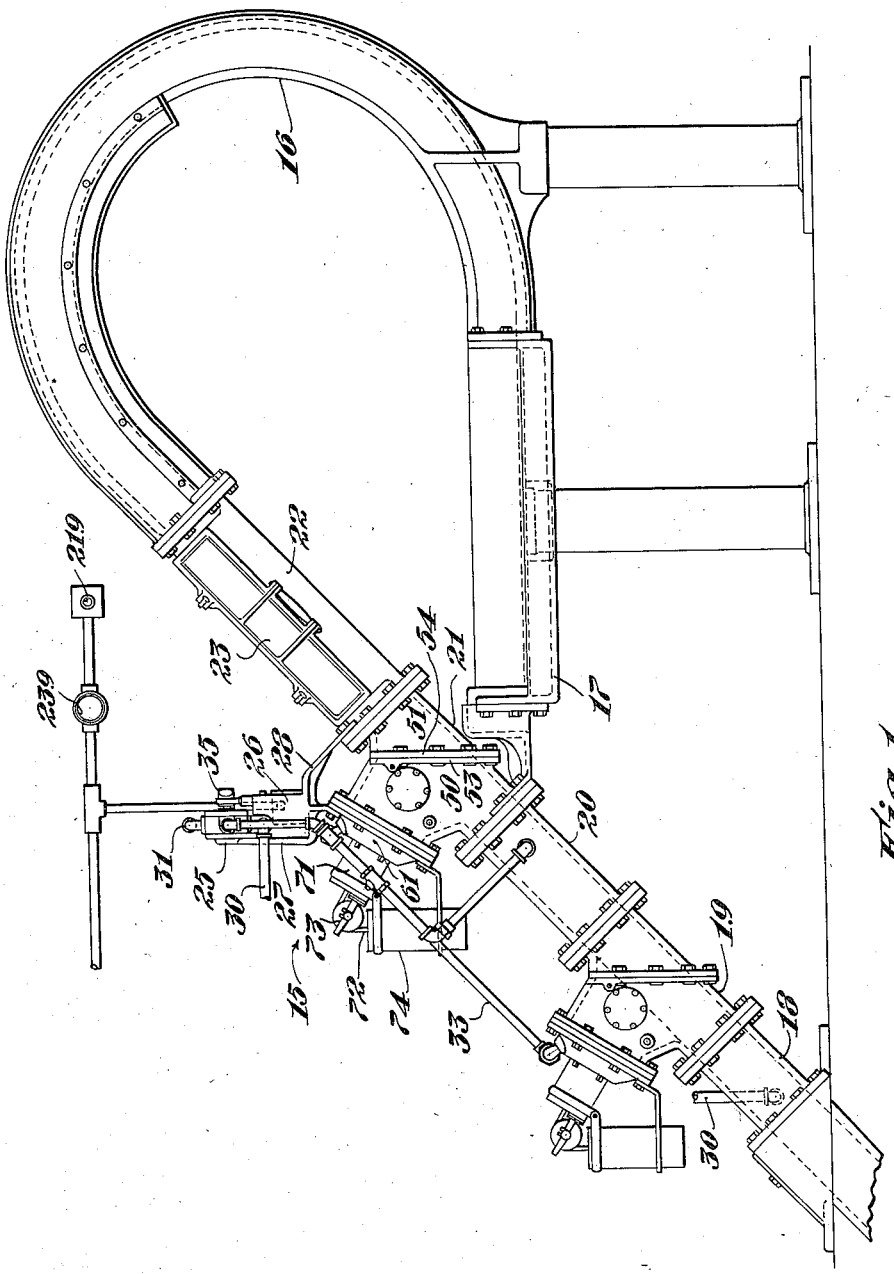
Figure 2:
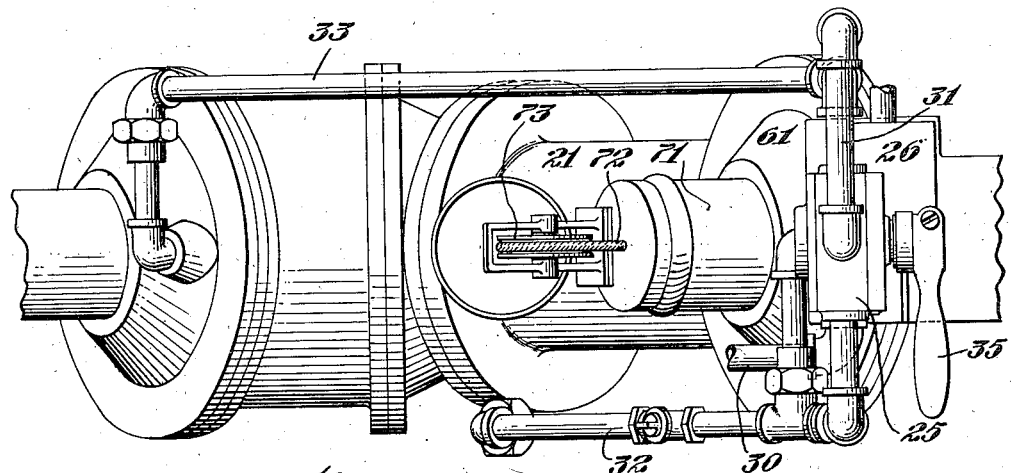
Fig. 2 is a plan view of a portion of that terminal illustrating particularly the control unit for the interlocking valves.

As shown in Fig. 1, each dispatch terminal 15 comprises a plurality of tube sections terminating in a receiving chute 16 of the open type which leads to a receiving trough or pan 17. The tube sections here shown comprise lengths 18, 19, 20, 21 and 22, sections 19 and 21 of which being identical in construction and including the valve mechanism which will be described later. The section 22 is provided with a cover 23, preferably hinged or otherwise secured in position, and serves as a dispatching inlet.

Supported upon the sections 21 and 22 are a valve control unit 25 and an electrical control unit 26, carried by brackets 27, 28. The control unit 25 may be of any desired type, that disclosed in the Jennings patent above-mentioned being here shown and not therefore here described in detail. It is sufficient to point out that when carriers are to be dispatched or are in transit from the terminal air is supplied to the unit through a pipe 30 from the source of supply for the carrier transmitting air (not shown), and is conducted therefrom by a pipe 31 leading to the atmosphere. The control unit 25 is connected to the valve of section 21 by a pipe 32 and to the valve of section 19 by a pipe 33.

Mounted within the casing of the control unit is a rotor actuated by a handle 35. In view of the disclosure in the patent, it will be understood that, when the handle 35 is in the position shown in Fig. 3, air is supplied under pressure to the pipe 33, while the pipe 32 is connected to the atmosphere through the outlet pipe 31, and that, when the handle is turned 90°, as shown in dotted lines on Fig. 3, air is supplied under pressure through the inlet pipe 30 to the pipe 32, and the pipe 33 is connected to the atmosphere through the outlet pipe 31.

The shaft 36 of the rotor to which the handle 35 is secured, also carries a cam 37, the periphery of which bears upon a pin 38 mounted for reciprocation in a bracket 39. At its lower end the pin 38 is provided with a set screw 40, the head of which bears upon a lever 41 pivoted at 42 to the bracket 39. The lever carries at its outer end a pin 43, the lower end of which is enlarged to form a button 44 which engages and actuates the electrical control unit 26. A spring 45 surrounding the pin 43 both tends to raise the lever 41 so that it normally assumes the position shown in dotted lines in Fig. 3 and also acts as a cushion for the button. The control unit 26 is of the well-known type by which circuits are made or broken, as illustrated diagrammatically in Fig. 6 and since the structure of this element forms no part of the present invention, it will not be described in detail.

The valve units carried by the sections 19 and 21 are identical in construction so that only one is shown in the drawings and will be described in detail, the upper unit mounted on section 21 having been selected. The section is preferably made in two parts 50 and 51, secured together by bolts 52 through abutting flanges 53, 54. Mounted within the part 50 is a valve clapper 55 including a plate 56 pivotally mounted upon a pin 57 carried by the flange 53, as shown particularly in Fig. 5, a disk 58 of leather, and a shoe 59 of metal the plate disk and shoe being suitably joined. The valve clapper 55 is pneumatically actuated in the present instance by a diaphragm 60 enclosed within a two section casing 61 mounted upon the part 50 and adapted to divide it into two compartments 62 and 63 in the usual manner. The center of the diaphragm 60 is reinforced by disks 65 and 66 and supports a shaft 67 connected by links 68 to the plate 56. The links 68, as shown particularly in Fig. 4, are pivotally secured at one end to the shaft 67 by a pin 69, and at the other end to the plate 56 by a pin 70. The outer end of the shaft 67 extends through a hood 71 mounted on the casing 61, and to it is secured a cable 72 passed around a pulley 73 and provided at its outer end with a counterweight 74.

The pipe 32 from the valve control unit 25 leads to the compartment 63 of the housing 61 and the pipe 33 leads to the corresponding compartment of the housing of the lower valve unit on the section 19. Obviously the counterweights act to hold the valves normally open but when air is introduced into the compartment 63 of either valve unit the diaphragm is forced to move into the position shown in dotted lines in Fig. 4, closing the valve and preventing the passage of air or a carrier through that section. When the handle 35 is shifted so that the pipe 32 is connected to the atmosphere through the pipe 31 and no air is introduced under pressure into the compartment, the weight 74 causes the diaphragm to resume its normal position and open the valve. In order to limit this opening movement of the valve, there is provided a pin 80 which may be surrounded by a cushioning tube 81 and against which the valve plate 56 bears, as shown in Fig. 4.

Figure 3:
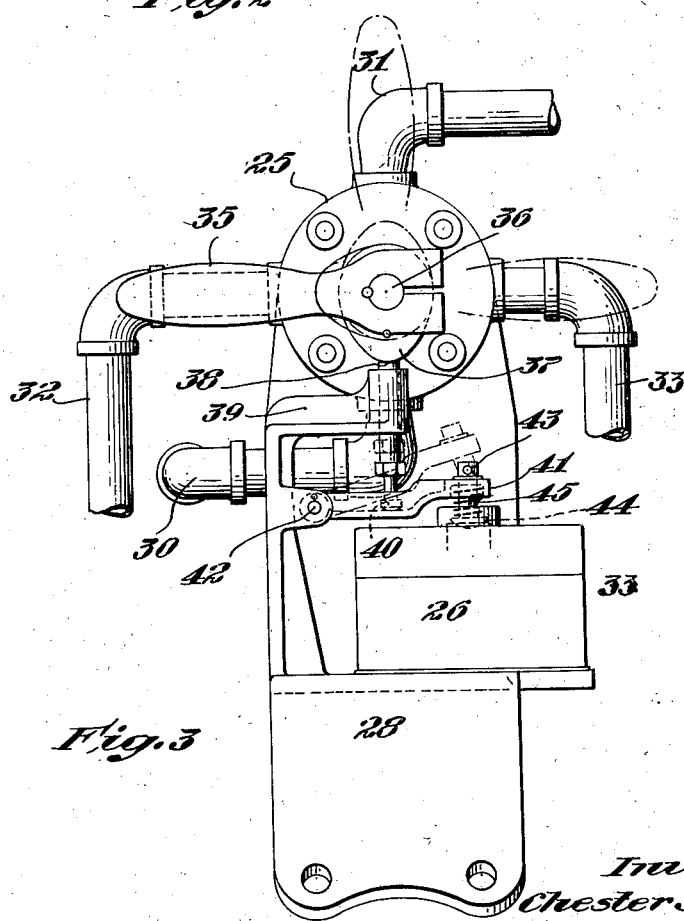
Fig. 3 is a side elevation of such valve control unit.

When a carrier is to be dispatched from a terminal, the handle 35 is thrown into the position shown in full lines in Fig. 3, to create a flow of air which causes the lower valve to be closed, while the upper valve remains open. The cover 23 is then raised and the carrier placed in the section 22 from which it descends by gravity past the upper valve and into contact with the closed lower valve. Upon throwing the handle 35 into the dotted line position, the upper valve will then be closed behind the carrier and the lower valve opened so that the carrier will advance into the tube and be transmitted to the other terminal by air pressure.

The operation of the handle 35 also acts through the lever 41 and the elements associated therewith, to actuate the electrical control unit 26 and thereby complete various circuits through which the operation of the motor or blower is controlled. The movement of the valve into the dotted line position causes the control unit 26 to complete a circuit through a time limiting relay which, after a predetermined period has elapsed, will operate to cut off the supply of air, usually subsequent to the arrival of the carrier at the receiving trough 17 of the destination terminal.

If, while the first carrier is in transit the operator desires to dispatch other carriers, the operation previously described will be repeated, that is to say, the handle 35 will be returned to the full line position, closing the lower valve and opening the upper valve, a carrier will then be inserted through the section 22, and the handle 35 will thereafter be returned to the dotted line position, opening the lower valve and closing the upper valve. At the same time the time limit relay will be reset.

The electrical operations will now be described with particular reference to the diagram in Fig. 6 and it will be assumed first that carriers are to be dispatched from station A to station B.

A button 200 within the electrical control unit 26 is depressed by the button 44 of the lever 41 either manually or by throwing the handle 35 to the left as in Fig. 3 which completes a primary circuit from the control source at station B through leads 302, 303, normally closed switch 304 of relay 205, lead 206, button 200, lead 207, coil 208 of relay 209, lead 210, coil 311 of relay 305 and lead 312.

The energizing of the coil 208 of relay 209 closes the normally open switch 213 and thus completes a control circuit from the source at station A through lead 202, switch 213 of relay 209, lead 214, coil 215 of starter relay 216, leads 217, 218, emergency switch 219, and leads 220 and 212. A signal circuit at station B completed by the energizing of coil 311 of the relay 305 and the consequent closing of the normally open switch 336 is traced through leads 302, 337, switch 336 of relay 305, lead 338, signal 339, lead 318, emergency switch 319, leads 320 and 312. The operator at station B is thus advised that the operator at station A has or is about to dispatch carriers. However the primary circuit above mentioned, by energizing the coil 311 of relay 305, has opened the normally closed switch 304 so that the depression of the button 300 at that station will be without effect.

The energizing of the coil 215 of the starter relay 216 closes the normally open switches 221 and 223 and completes at station A a holding by-pass for the primary circuit and also a power circuit. The holding by-pass begins at lead 303, through leads 224, and 225, switch 223 of starter relay 216, lead 226, normally closed switch 227 of the time limit relay 228, lead 229 to coil 208 of relay 209. The motor 222 is set into motion by the completion of leads 240 through the closure of the switches 221. Thus the circuits above described are, by the holding by-pass, maintained independent of the position of the button 200.

When the button 200 is released as by throwing the handle 35 to the right (see Fig. 3) it completes the following circuit through the time limit relay 228; from lead 202 and switch 213, through lead 230, button 200, lead 232, solenoid unit 233, leads 234, 235 and 218, emergency switch 219, and leads 220 and 212. The solenoid unit 233 acts in the well known way after a predetermined interval to open the switch 227 and break the holding by-pass of the primary circuit whereupon the other circuits are broken and the system is at rest.

When dispatching in the opposite direction from station B to station A corresponding circuits are completed. The depression of the button 300 completes a primary circuit from the source at station B through leads 302, 303, and 224, coil 211 of relay 205, lead 310, coil 308 of relay 309, lead 307, button 300, lead 306, switch 304 of relay 305, and leads 324, and 312. The coil 308 of relay 309 closes the normally open switch 313 and completes a control circuit at station B through lead 302, switch 313, lead 314, coil 315 of the starter relay 316, leads 317 and 318, emergency switch 319 and leads 320 and 312. The signal circuit at station A is completed by the energizing of the coil 211 of relay 205 which closes the normally open switch 236 and is traced through leads 202, and 237, switch 236 of relay 205, lead 238, signal 239, lead 218, emergency switch 219 and leads 220 and 212. The energizing of the coil 315 of the starter relay 316 by the control circuit at station B closes switches 323 and 321 and completes a holding by-pass through lead 329, switch 327 of the time limit relay 328, lead 326, switch 325 of the relay 316, leads 325, 324 and 312 and also completes the leads 340 through switches 321 by which the motor 322 is set into operation. The release of the button 300 as by the handle of the valve control unit completes a circuit through the time limit relay 328, which may be traced as follows: lead 302, switch 313, lead 330, button 300, lead 332, solenoid unit 333 of relay 328, leads 334, 335 and 318, emergency switch 319 and leads 320 and 312. After a predetermined period the solenoid unit 333 opens the switch 327 and breaks the circuits above described thus bringing the system to rest and restoring the valves to their normal open position.

The subsequent operation of the control unit 25 in dispatching other carriers while the first carrier is in transit resets the time limit relay but does not affect the primary control signal or power circuits other than that the resetting of the relay lengthens the period during which these circuits are maintained.

From the foregoing description it will be apparent that the source of the primary circuits set up by the operators at either station is at station B; that the control and power circuits set up at the dispatching stations are independent of the sources of current at the receiving stations; that throwing the handle 35 into the full line position automatically sets the system in operation and simultaneously closes the lower valve and opens the upper valve; that throwing the handle 35 into the dotted line position to close the upper valve and open the lower valve simultaneously sets the time limit relay in operation concomitantly with the beginning of travel of the carrier.

The embodiment shown in Figs. 7, 8 and 9 differs from the embodiment just described in that the upper and lower valves at the terminal are positively opened and closed, no reliance being placed upon the action of the air. As shown in Fig. 7, the terminal 100 comprises a plurality of tube sections terminating in the curved receiving chute 101, which leads to a receiving trough or pan 102. The tube sections 103, 104, 105 and 106 are suitably secured together, and the sections 104 and 106 include the lower and upper valve units 107 and 108 respectively. These units are, so far as the valve construction is concerned, identical, each unit including a plate 110, which supports a disk 111 and a shoe 112, and a yielding tube 113 carried by a pin 114 against which the valves rest when in the normal open position.

Secured to the ends of the shaft 115 are links 116 by which the shaft is connected to bars 117 adapted to be raised and lowered by means of a reciprocating element, in the present instance a thrustor 120. It will be understood that one end of each link 116 is keyed to the shaft, so that the motion of the bars is communicated thereto. As shown in Figs. 8 and 9, the thrustor 120 comprises a motor 121 which, through a shaft 122, operates an impeller pump 123. The shaft 122 is, as shown in Fig. 9, made of two telescoped sections splined to permit relative longitudinal movements. The impeller pump 123 is enclosed within a piston 124, to which is connected a push rod 125, which extends through the casing of the thrustor. Parallel to the push rod 125 is a similar push rod 126 which extends through the casing into the interior thereof. The push rods 125 and 126 are connected by a crossbar 127 which supports a clevis 128 extending between tongues 129 and secured thereto by a pin 130. The tongues 129 are integral with a bracket 131 suitably secured, as by screws 132, to a yoke 133. The legs of the yoke 133 terminate in the bars 117 previously mentioned and secured thereto are weights 134 which insure the smooth operation of the thrustor. The thrustor is supported in a cup 135 carried by, and as here shown, integral with, a bracket 136 mounted upon the section beyond the section including the valve unit controlled by the thrustor. In order to secure the thrustor in position, a clevis 137 extending from the lower end of the thrustor is held by a pin 138 passing through the clevis and the opposite walls of the bracket.

Mounted upon the chute 101 is a valve control unit 150 and an electrical control unit 151, these units being supported upon a suitably formed bracket 152. The control unit 150 is similar in every respect to the control unit 25 previously described. Since the valves are operated by the thrustors, it obviously is not necessary that air be conducted from the control unit 150 to the various valves. However, the pipe 153, which corresponds to the pipe 32, enters the section 105, while the pipe 154 which corresponds to the pipe 30 enters the section 103. The valve control unit 150 is thus connected to the source of air by an inlet pipe 154, and to the atmosphere through an outlet pipe 156.

The handle 157 controls the position of the rotor in the unit 150, and mounted upon it is a cam 158, which acts upon reciprocating pin 159 to actuate the electrical control unit 151 in the same manner as the cam 37 actuates the control unit 26. The control unit 151 is electrically connected through a conduit 160 to one source of supply, and through a conduit 161 to a contactor casing 162 on the upper valve unit, and a contactor casing 163 on the lower valve unit. The contactors within the casings 162 and 163 are normally open, but are adapted to be closed when the valves associated therewith are open.

When a carrier is to be dispatched from a terminal of this type the handle 157 is thrown to the left and the control unit actuated. Through the electrical circuits thus completed as set forth hereinbelow the lower valve unit 107 is closed and at the same time air is supplied under pressure through the pipe 154 to section 103 while section 105 is connected to the atmosphere through pipe 153. The carrier is then introduced into the chute 101 through an open inlet 170 and descends by gravity past the open upper valve unit 108. The handle 157 is then thrown to the right whereupon the unit 108 is closed and the unit 107 is opened allowing the carrier to pass into the transit tube by which it is conducted to the other station. At the same time air is supplied under pressure through the pipe 153 to section 105 while section 103 is connected to the atmosphere through pipe 154. The supply of air to the tube sections concomitantly with the opening and closing of the valve units is essential in order to vent and fill the air spaces above and below the valve units since otherwise the electrically controlled elements would be unable to operate the valves.

The electrical operations will now be described with reference to the wiring diagram in Fig. 10. It is first assumed that an operator at station A' desiring to dispatch one or more carriers to station B' has thrown the handle 157 to the left thus depressing button 400.

The depression of button 400 at station A' completes a pilot circuit traced as follows:

Leads 501, 502, contactor 503 of upper valve unit, lead 504, contactor 505 of lower valve unit, lead 506, coil 507 of relay 508 (this relay completes the control circuit at station B'), lead 509, coil 410 of relay 411 (this relay completes the control circuit at station A'), lead 412, button 400, lead 413, switch 414 (normally closed) of relay 408 to a ground. It will be noted that this circuit can not be completed if the contactor of either valve unit at station B' is open which would be the case if either valve were closed and in the path of travel of the carrier.

The control circuit at station A' completed by the relay 411 may be traced as follows: lead 415, emergency switch 416, lead 417, lead 418, coil 419 of starter relay 420 (this relay controls a holding by-pass for the pilot circuit and also completes the power circuit), lead 421, switch 422 of relay 411, lead 423.

The control circuit at station B' controlled by relay 508 advises the operator at that station of the condition of the line and the intent of the operator at station A' to dispatch carriers to station B'. The circuit thus made is traced as follows: through lead 515, emergency switch 516, lead 517, lead 539, signal 540, lead 541, switch 542 of relay 508, and lead 523.

The holding by-pass for the pilot circuit above referred to is completed by the energizing of coil 419 of the starter relay 420 previously disclosed. This by-pass acts to maintain the pilot circuit independent of the position of the button 400 and may be traced as follows: from lead 412 through lead 424, switch 425 of the time limit relay 426, lead 427, switch 428 of the starter relay 420 to the ground. The starter relay 420 also completes the power circuit for the motor 431 at station A', through leads 429 and switches 430. The lower valve at station A' is held closed by the following valve control circuit: from lead 417 through lead 432, lower valve actuator 433 (thrustor 120), lead 434, switch 435 of the valve relay 436, lead 437 and lead 438 to lead 421. The operator next places a carrier into the chute 101 through the inlet 170 and releases the button 400, which, however, does not break the pilot circuit because of the holding by-pass established as pointed out above. The button 400 now completes circuits through the coil of the valve control relay 436, and through the time limit relay 426 opening the lower valve and closing the upper valve. The valve control circuit may be traced from lead 417 through coil 443 of the relay 436, lead 444, button 400, lead 445 and lead 438 to lead 421. The time limit relay circuit is completed from lead 444 through lead 446, solenoid unit 447 and lead 448 to lead 417. The energizing of the coil 443 of relay 436 causes the switch 435 to shift from the full line position into dotted line position, breaking the circuit previously traced through the lower valve actuator 433 and completing a circuit through the upper valve actuator 450; to wit from lead 417 through lead 449, upper valve actuator 450 (a thrustor 120), lead 451, switch 435 and lead 437 to lead 438.

When the predetermined period has lapsed the time limit relay 426 acts in the usual well known manner the solenoid unit opening the switch 425 thus breaking the various pilot and control circuits and opening the upper valve so that the various parts have resumed the position shown in full lines on the drawings and the system is at rest. If, after one carrier has been dispatched and before the time limit relay has acted, the operator desires to dispatch a second carrier, this can be done without difficulty by repeating the operation previously described, thereby resetting the solenoid unit 447 so that the motor will continue to operate until after the last dispatched carrier has arrived at station B'.

When an operator at station B' is to dispatch carriers to station A, the same procedure described above is followed, it being understood, of course, that different leads are energized to complete various circuits which will be described briefly without comment. Upon depressing the button 500 a pilot circuit is completed from lead 501, through lead 552, switch 514, lead 513, button 500, lead 512, coil 510 of relay 511, lead 553, coil 407 of relay 408, lead 406, contactor 405 of the lower valve unit, lead 404, contactor 403 of the upper valve unit, lead 402 to the ground. The control circuit completed at B' is through lead 515, emergency switch 516, lead 517, lead 518, coil 519 of starter relay 520, lead 521, switch 522 of relay 511, to lead 523. The control circuit completed at station A' is through lead 415, emergency switch 416, lead 417, lead 439, signal 440, lead 441, switch 442 of relay 408 and lead 460. The holding by-pass for the pilot circuit completed at station B' is from lead 552 through lead 554, switch 528 of relay 520, lead 527, switch 525 of time relay 526, and lead 524 to lead 512. A power circuit completed at that station is through leads 529 and switches 530 of relay 520, energizing the motor 531. The circuits through the actuators of the upper and lower valve units and through the solenoid unit of the time limit relay will not be traced, it being obvious from an inspection of the drawings that they are identical with the circuits previously described with respect to the dispatching from station A'.

Figure 11:
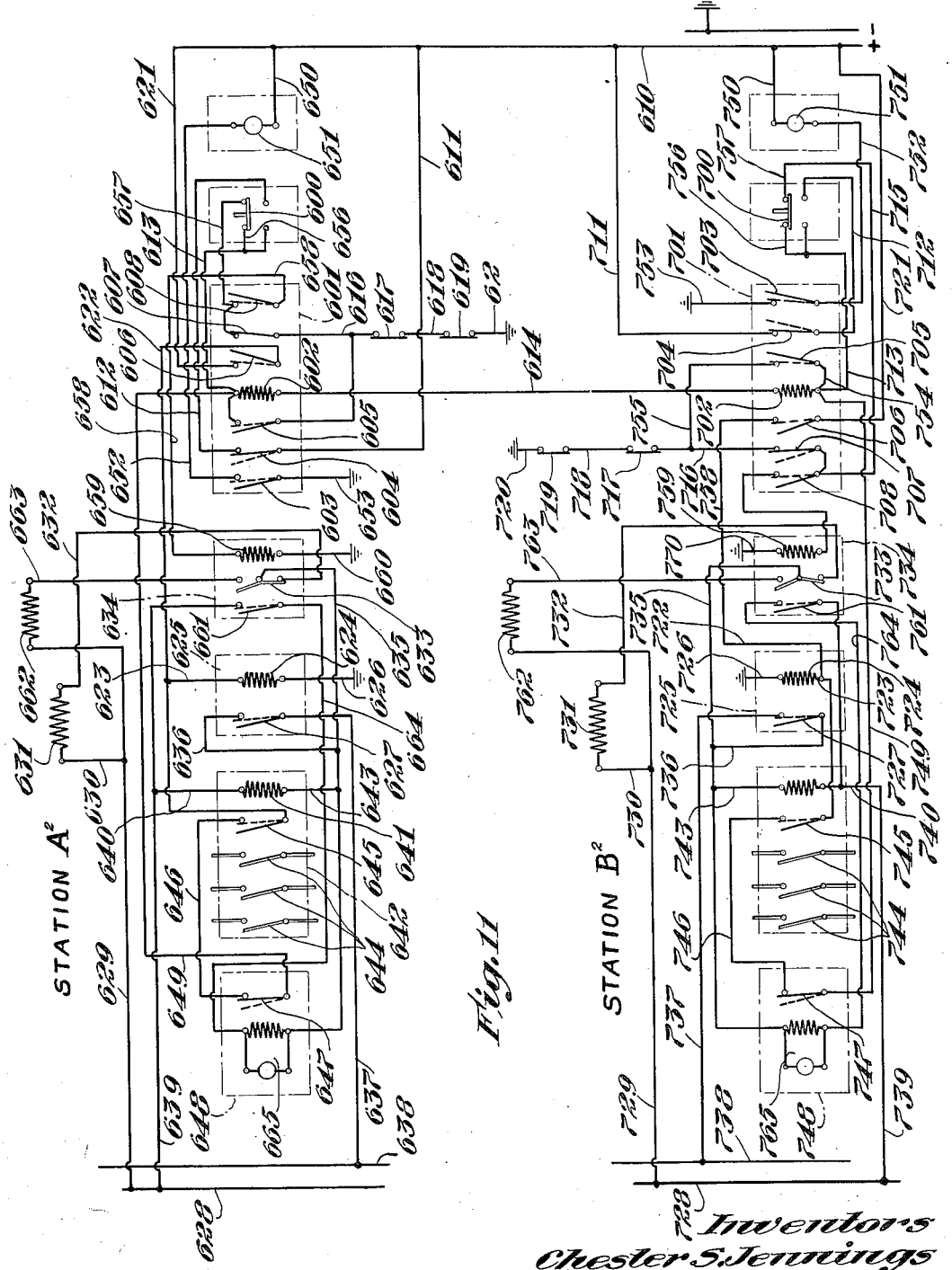
Fig. 11 is a diagram showing another form of wiring which might be so employed.

The wiring diagram shown in Fig. 11 is similar to that shown in Fig. 10 in that only two wires connect the terminals and the control shown is applicable to the embodiment set forth in Figs. 7, 8 and 9 but since it includes polarized relays it can only be used on direct current service. The polarized relay 601 at station A² comprises a coil 602, and two groups of switches. One group comprising switches 603, 604 and 605, is actuated when current flows through the relay coil from a source at station B²; while the other group, comprising switches 606, 607 and 608, is actuated when current flows through the relay coil from a source at station A². As shown in the diagram switches 603, 605, 606 and 608 are normally open and switches 604 and 607 are normally closed. The polarized relay at station B² is identical in structure and operation with that at station A² and hence will not be described in detail, reference characters beginning at 701 being used upon the diagram to designate the elements thereof.

The various circuits set up by the control will be described briefly without any detailed discussion of the operation of the system.

When an operator at station A² desires to dispatch a carrier to station B² the button 600 is depressed thus completing a primary circuit from the positive lead 610, through lead 611, switch 604 of polarized relay 601, lead 612, button 600, lead 613, coil 602 of relay 601, lead 614, coil 702 of relay 701, leads 713, and 756, button 700, lead 757, lead 715, switch 707 of relay 701, lead 716, contactor 717 of lower valve unit, lead 718, contactor 719 of upper valve unit, lead 720 to the ground.

The relay 601 thus completes a circuit from positive lead 610 through lead 621, switch 606 of relay 601, lead 622, lead 623, coil 624 of relay 625 and lead 626 to the ground. The coil 624 when energized closes the normally open switch 627 of the relay 625 and completes a circuit by which the thrustor 120 of the lower valve unit is caused to close that valve, and which is traced from positive lead 628 of a local control circuit through leads 629 and 630, coil 631, which when energized actuates the thrustor, lead 632, switch 633 of relay 634, leads 635 and 636, switch 627 and lead 637 to the negative lead 638 of the local circuit. The closure of the switch 627 also completes a circuit from the positive lead 628 through leads 639 and 640, coil 641 of power starter relay 642, leads 643, 635 and 636, switch 627, and lead 637 to the negative lead 638.

The energizing of coil 641 closes the power switches 644 whereby the blower or motor is set into operation, and also closes switch 645 which completes a holding by-pass from lead 622 through switch 645, lead 646, normally closed switch 647 of the time limit relay 648 and lead 649 to the coil 602, thus insuring the maintenance of the various circuits above described independent of the position of the button 600.

The primary circuit also completes two circuits at station B². First, a signal operating circuit which advises the operator at station B² that the operator at station A² has taken control of the system and comprises lead 750 from the positive lead 610, signal 751, lead 752, switch 703 and lead 753 to the ground. Second, a holding by-pass from coil 702 which makes the primary circuit independent of the position of the button 700 and comprises lead 754, switch 705, and lead 755 to lead 716 and thence through the contactors 717 and 719 to the ground.

These circuits having been set up the carrier is introduced into the terminal at station A² and the button 600 shifted into the full line position which completes a circuit from lead 649 through leads 613 and 656, button 600, lead 657, switch 608, lead 658, coil 659 of relay 634, lead 660 to the ground. The energizing of the coil 659, closes switch 661 and shifts switch 633 into the dotted line position thus completing two circuits, and opening the circuit described above by which the lower valve was closed. One such circuit closes the upper valve and comprises lead 629, coil 662 which operates thrustor 120 of that valve unit, lead 663, switch 633, leads 635 and 636, switch 627 and lead 637 to negative lead 638. The other circuit energizes the solenoid unit of the time limit relay 648 from positive lead 628 through lead 639, switch 661, lead 664, solenoid unit 665, leads 635 and 636, switch 627 and lead 637 to negative lead 638. The carrier now passes the lower valve unit and proceeds to the terminal at station B² and the circuits set up are maintained until the solenoid unit 665, after a predetermined period, opens the switch 647. Dispatching of other carriers from station A² before the switch 647 is opened may be done by repeating the movements of the button 600 previously described.

When carriers are to be dispatched from station B² to station A² similar operations are performed and similar circuits set up. These circuits will not be described but since the elements on the wiring diagram at station B² have numerals in the seven hundred series corresponding to those in the six hundred series at station A² they can be readily traced.

While certain embodiments of the invention have been shown and described it will be understood that we are not limited thereto since changes may be made in these embodiments or other embodiments devised without departing from the spirit and scope of the invention as set forth in the following claims.

We claim:

1. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, and means actuated by said source, which means, when a carrier is to be dispatched from either station, closes the normally open circuit at the dispatching station and permits the control of the valves at that station.

2. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, and means actuated by said source, which means, when a carrier is to be dispatched from either station, closes the normally open circuit at the receiving station to actuate the signal and thus advise the operator at that station of the intent of the operator at the other station.

3. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, and means actuated by said source, which means, when a carrier is to be dispatched from either station, closes the normally open circuits at both stations, whereby the valves at the dispatching station may be controlled and the signal at the receiving station is actuated to advise the operator at that station of the intent of the operator at the dispatching station.

4. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, two wires through which current supplied by said source flows to and from the other station, means actuated by said source including electrically controlled elements at each station, which elements include normally open switches in the station circuits, and a control switch at each station, the closing of which at either station causes the current from said source to actuate the elements and close the switches in the power circuit at that station, whereby the operation of the valves at that station may be controlled.

5. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, two wires through which current supplied by said source flows to and from the other station, means actuated by said source including electrically controlled elements at each station, which elements include normally open switches in the station circuits, and a control switch at each station, the closing of which at either station causes the current from said source to actuate the elements and close the switches in the power circuit at the other station, to actuate the signal at that station, whereby to advise the operator of the intent of the operator at the first-named station.

6. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, two wires through which current supplied by said source flows to and from the other station, means actuated by said source including electrically controlled elements at each station, which elements include normally open switches in the station circuits, and a control switch at each station, the closing of which at either station causes the current from said source to actuate the elements and close the switches in the power circuit at each station whereby the operation of the valves at that station may be controlled and the signal at the other station is actuated to advise the operator of the intent of the operator at the first-named station.

7. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, two wires through which current supplied by said source flows to and from the other station, means actuated by said source including electrically controlled elements at each station, which elements include normally open switches in the station circuits, and a control switch at each station, the closing of which at either station causes the current from said source to actuate the elements and close the switches in the power circuit at that station, whereby the operation of the valves at that station may be controlled and complete a by-pass around the control switch at such station whereby the power circuit is thereafter maintained independent of the control switch.

8. In a pneumatic dispatch system including two stations, each provided with a terminal, and a transit tube connecting said terminals and through which carriers may be dispatched from either station to the other station, each terminal including a passage forming a continuation of the tube and through which carriers may travel, interlocking valves in said passage, a signal, means at each station for controlling the operation of the valves and signal, such means including a normally open electrical power circuit, a source of electric current at one station only, two wires through which current supplied by said source flows to and from the other station, means actuated by said source including electrically controlled elements at each station, which elements include normally open switches in the station circuits, and a control switch at each station, the closing of which switch at either station causes the current from said source to actuate the elements and close the switches in the power circuit at the other station to actuate the signal at that station, whereby to advise the operator of the intent of the operator at the first-named station and to short circuit the control switch of that station, whereby the power circuit is maintained independent of the control switch.

9. In a pneumatic dispatch system including a station terminal and a transit tube through which carriers may be dispatched, said terminal including a passage which forms a continuation of the tube and through which carriers travel, interlocking valves which open and close said passage, electrically operated means for closing and opening said valves, means for creating a flow of air through said tube, and a control device by which said electrically operated means are actuated seriatim and said flow-creating means is set into operation.

10. In a pneumatic dispatch system including a terminal and a transit tube leading therefrom, said terminal having a passage forming a continuation of said tube and by which carriers to be dispatched travel to said tube, two valves in said passage, either of which valves when closed prevents the travel of carriers through the passage, means for operating said valves independently, means for creating a flow of air through said tube, a control device including a movable member which in one position sets said flow-creating means in operation and causes said operating means to close one valve and open the other valve, and in another position closes the other valve and opens the first valve, the status of the flow-creating means being independent of the member in this position, and means for diverting a part of the air flow into the passage in advance of whichever valve is being closed.

11. In a pneumatic dispatch system including a terminal and a transit tube leading therefrom, said terminal having a passage forming a continuation of said tube and by which carriers to be dispatched travel to said tube, two valves in said passage, either of which valves when closed prevents the travel of carriers through the passage, means for operating said valves independently, means for creating a flow of air through said tube, a control device including a movable member which in one position sets said flow-creating means in operation and causes said operating means to close one valve and open the other valve, and in another position closes the other valve and opens the first valve, the status of the flow-creating means being independent of the member in this position, and means for diverting a part of the air flow into the passage in advance of whichever valve is being closed, and for venting the passage behind that valve.

12. In a pneumatic dispatch system including two stations, each provided with a terminal, and a transit tube connecting said terminals and through which carriers can be dispatched from either station to the other station, the terminal at each station including a passage which forms a continuation of said tube, two interlocking valves which when closed prevent the travel of carriers through the passage, an electrical contactor associated with each valve, an electrical power circuit at each station, relays comprising switches in said circuit and coils which when energized hold said switches in a predetermined position, and a primary circuit at each station from a source of current at one station only, each primary circuit including a normally open switch at one station, the coils of relays at each station and the contactors of the valves at the other station, each of which contactors opens the circuit when the valve associated therewith is closed and closes the circuit when the valve associated therewith is open, the completion of the primary circuit at either station by the closure of the switch thereat acting, when the valves in the terminal of the other station are open, to energize the relay coils, thereby causing the relay switches to close the power circuit at the selected station, whereby the valves at that station may be operated and a carrier be dispatched therefrom.

13. In a pneumatic dispatch system including two stations, each provided with a terminal, and a transit tube connecting said terminals and through which carriers can be dispatched from either station to the other station, the terminal at each station including a passage which forms a continuation of said tube, two interlocking valves which when closed prevent the travel of carriers through the passage, an electrical contactor associated with each valve, an electrical power circuit at each station, relays comprising switches in said circuit and coils which when energized hold said switches in a predetermined position, a primary circuit at each station from a source of current at one station only, each circuit including a normally open switch at one station, the coils of relays at each station and the contactors of the valves at the other station, each of which contactors opens the circuit when the valve associated therewith is closed and closes the circuit when the valve associated therewith is open, the completion of the primary circuit at either station by the closure of the switch thereat acting, when the valves in the terminal of the other station are open, to energize the relay coils, thereby causing the relay switches to close the power circuit at the selected station, whereby the valves at that station may be operated and a carrier be dispatched therefrom, and a time limit relay at each station energized when the station switch is reopened and caused to break the primary and power circuits thus established after a predetermined interval.

14. In a pneumatic dispatch system including a terminal and a transit tube leading therefrom, means for creating a flow of air through said tube, said terminal having a passage forming a continuation of said tube and by which carriers to be dispatched travel to said tube, two normally open valves in said passage, either of which valves when closed prevents the travel of the carriers through the passage, an electrically operated mechanism associated with each valve for opening and closing the same, each mechanism being operable independently of the other, and a control device including a movable member which, in one position sets the flow-creating means in operation and causes the mechanism associated with one valve to close such valve, and, in another position causes the first-named mechanism associated with the other valve to close such valve, the status of the flow-creating means being unaffected by the member in the last-named position.

15. In a pneumatic dispatch system including a terminal and a transit tube leading therefrom, means for creating a flow of air through said tube, said terminal having a passage forming a continuation of said tube and by which carriers to be dispatched travel to said tube, two normally open valves in said passage, either of which valves when closed prevents the travel of the carriers through the passage, an electrically operated mechanism associated with each valve for opening and closing the same, each mechanism being operable independently of the other, a control device including a movable member which, in one position sets the flow-creating means in operation and causes the mechanism associated with one valve to close such valve, and, in another position causes the first-named mechanism associated with the other valve to close such valve, the status of the flow-creating means being unaffected by the member in the last-named position, and means controlled by said member for diverting a part of the air flow into the passage in advance of whichever valve is being closed.

16. In a pneumatic dispatch system including a terminal and a transit tube leading therefrom, means for creating a flow of air through said tube, said terminal having a passage forming a continuation of said tube and by which carriers to be dispatched travel to said tube, two normally open valves in said passage, either of which valves when closed prevents the travel of the carriers through the passage, an electrically operated mechanism associated with each valve for opening and closing the same, each mechanism being operable independently of the other, a control device including a movable member which, in one position sets the flow-creating means in operation and causes the mechanism associated with one valve to close such valve, and, in another position causes the first-named mechanism associated with the other valve to close such valve, the status of the flow-creating means being unaffected by the member in the last-named position, and means controlled by said member for diverting a part of the air flow into the passage in advance of whichever valve is being closed and for venting the passage behind such valve.

17. In a pneumatic dispatch system including a station terminal, a transit tube through which carriers are dispatched and means for creating a carrier dispatching flow of air through the tube, said terminal including a passage which forms a continuation of the tube and through which carriers travel to or from the tube, valves which open and close said passage, mechanism for opening and closing each of said valves independently, means for operating said mechanism and a control unit by which said flow creating means is set into operation, said unit including movable means which in one position causes said mechanism operating means to close one valve and in another position causes said mechanism operating means to close the other valve, the status of the flow creating means being unaffected by the movement of said means from one position to the other.

18. In a pneumatic dispatch system including a station terminal, a transit tube through which carriers are dispatched and means for creating a carrier dispatching flow of air through the tube, said terminal including a passage which forms a continuation of the tube and through which carriers travel to or from the tube, valves which open and close said passage, mechanism for opening and closing each of said valves, a control unit for operating said valve mechanisms independently, and a control unit by which said flow creating means is set into operation, said last named unit including a movable member which in one position causes said first named unit to operate the mechanism of one valve and in another position causes said first named unit to operate the mechanism of the other valve, the status of the flow creating means being unaffected by the movement of said means from one position to the other.

19. In a pneumatic dispatch system including two stations, each provided with a terminal at which carriers may be received and from which carriers may be dispatched, a transit tube connecting said terminals and through which carriers may be dispatched from either station to the other station, and means for creating a carrier impelling flow of air in the transit tube, each terminal including a passage forming a continuation of the tube and through which carriers may travel, interlocking valves in said passage and a signal, means at each station for controlling the operation of the flow creating means, the valves and the signal thereat, such means including normally open electrical circuits, and a source of electrical current therefor, and means for closing said circuits comprising a source of electrical current at one station only, a normally open primary circuit supplied from said source, controls at both said stations for said primary circuit, and means at both stations actuated by said primary circuit, for closing the normally open circuits thereat so that, when a carrier is to be dispatched from either station, the actuation of the control of the primary circuit at that station causes the means actuated by the circuit to close the normally open circuits controlling the flow creating means, and valves at the dispatch station and the normally open circuit controlling the signal at the receiving station.

20. In a pneumatic dispatch system including two stations, each provided with a terminal at which carriers may be received and from which carriers may be dispatched, a transit tube connecting said terminals and through which carriers may be dispatched from either station to the other station, and means for creating a carrier impelling flow of air in the transit tube, each terminal including a passage forming a continuation of the tube and through which carriers may travel, and a signal, means at each station for controlling the operation of the flow creating means and the signal, such means including normally open electrical circuits, and a source of electrical current therefor, and means for selectively closing said circuits comprising a source of electrical current at one station only, a normally open primary circuit supplied from said source, controls at both said stations for said primary circuit and means at both stations actuated by said primary circuit for closing the normally open circuits thereat so that when a carrier is to be dispatched from either station, the actuation of the control of the primary circuit at that station causes the means actuated by the circuit to close the normally open circuit controlling the flow creating means at the dispatch station and the normally open circuit controlling the signal at the receiving station.

CHESTER S. JENNINGS.
FRANK W. MacMARTIN.